United States Patent [19]

Just

[11] Patent Number: 5,650,100

[45] Date of Patent: Jul. 22, 1997

[54] APPARATUS FOR PROVIDING ABSORPTION OF GASEOUS AND LIQUID PHASES

[76] Inventor: Gerard A. Just, P.O. Box 2522, New Orleans, La. 70176

[21] Appl. No.: 519,579

[22] Filed: Aug. 25, 1995

[51] Int. Cl.⁶ .................................................. B01F 3/04
[52] U.S. Cl. ...................... 261/93; 366/164.1; 366/164.6; 366/172.1; 366/172.2; 366/264; 366/608
[58] Field of Search .......................... 261/93; 366/164.1, 366/164.6, 172.1, 172.2, 264, 608

[56] References Cited

U.S. PATENT DOCUMENTS

| | | |
|---|---|---|
| 2,063,751 | 12/1936 | Patek ........................................ 261/93 |
| 2,433,592 | 12/1947 | Booth ........................................ 261/93 |
| 3,204,861 | 9/1965 | Brown ....................................... 261/93 |
| 3,233,876 | 2/1966 | Faure et al. ............................. 366/164.6 |
| 4,490,049 | 12/1984 | Sanders et al. ......................... 366/164.6 |
| 4,514,343 | 4/1985 | Cramer et al. ............................ 261/93 |
| 4,925,575 | 5/1990 | Just ........................................... 261/93 |
| 5,451,348 | 9/1995 | Kingsley .................................... 261/93 |

Primary Examiner—Tim R. Miles
Attorney, Agent, or Firm—Beirne, Maynard & Parsons, L.L.P.

[57] ABSTRACT

The invention is directed to an apparatus for providing absorption of two fluid phases with one another. One of the phases made be a gaseous phase, while the other phase may be a liquid phase.

8 Claims, 3 Drawing Sheets

APPARATUS FOR PROVIDING ABSORPTION OF GASEOUS AND LIQUID PHASES

BACKGROUND OF THE INVENTION

1. Field of the Invention

The invention relates to the absorption of fluid phases with one another, such as a liquid with a gas.

2. Description of the Prior Art

In many industries, it is necessary to mix or absorb a gas into a liquid stream in order to initiate a chemical reaction or thermal transfer for desired combination with an end compound product. For example, absorption of oxygen into water is necessary to restore depleted oxygen to water, the resulting product being used to oxygenate large aquarium or waste waters that are oxygen depleted. Additionally, absorption of a gas, such as oxygen into a liquid phase, such as water, which is heavily laden with dissolved iron, will assist the perception of iron to a particulate for removal purposes. Additionally, steam as a gas can be induced into condensate return water for removal of $CO_2$ gas in deairation processes.

In my U.S. Pat. No. 4,925,575, issued May 15, 1990, entitled "System For Separating Phases Of A Liquid Stream" there is shown a device similar to the device in the present invention for separating phases of a liquid stream. I have now found that by modifying the device, as described herein, I can provide an apparatus for absorption, as opposed to separation, of various fluid phases. For example, the new device may be used in the chlorinating of waste water. In such procedures, chlorine gas is used, and with my improved device, a measured amount of chlorine gas can be induced and mixed through absorption into the water phase for disinfection purposes. Additionally, my new device provides for ambient air (which is a gas) to be drawn through the device and cooled to the temperature of the water being recirculated throughout a chamber containing the device. My new device may be side mounted into a tank and the tank may be pressurized to supersaturate any liquid with any gas up to the design pressure of the components of the device and compatible components with the liquid and gases.

My new device may also be used for a liquid/liquid mixing application by sizing the impellers to provide a controlled amount of fluid which can be mixed with another fluid, such as water which is desired to be mixed with liquid lemon extract to make lemonade, or the like, or with orange juice extract to make orange juice or medicine for pharmaceuticals.

My new device may be staged such that plural devices are used in conjunction with a chamber within a tank with the devices being spaced selectively along a horizontal plane or vertically spaced around the tank.

Typically, the impellers used in the device will be of the vaned variety, well know to those skilled in the art. Alternatively, the impellers may be propellers. The impellers may be of various sizing relative to one another for desired regulation of the gas or liquid absorption, and one skilled in this art will readily be able to select the sizing of the impellers with the little or no experimentation or testing. The vessel or chamber may be pressurized as well as heated or cooled to provide for the interior of the chamber becoming a chemical reactor by application of a heating or cooling probe within or around the chamber, as is well known to those skilled in the art. Pressure may be applied to the vessel or chamber in known ways and the particular means for applying such pressure is not a part of this invention, other than through its combination with other elements defined herein.

SUMMARY OF THE INVENTION

In one embodiment of the present invention, an apparatus is provided for absorption of a gaseous fluid phase with a liquid phase. The apparatus comprises a vessel which defines a central chamber and has a plurality of fluid phase introduction passages therein. A shaft traverses the central chamber, with the shaft having distal and dorsal ends. Motor means are provided for manipulating, preferably by rotation, the shaft with the motor communicating with the shaft at its dorsal end. A plurality of impellers are carried around the shaft and positioned distally away from the shaft dorsal end. Means are provided for introduction of the liquid phase into the central chamber between one of the impellers and the shaft dorsal end.

The invention also includes means for introducing gaseous fluid phase into the central chamber between the impeller means. Vacuum initiating means, such as a squirrel cage vacuum draw, well known to those skilled in the art, is provided to introduce a gas body. The vacuum initiating means is carried around the shaft between the impellers and is in substantial axial alignment with the introduction means of the gaseous fluid phase into the central chamber. Finally, a discharge open end is defined though the vessel and communicated with the chamber for transporting the resulting absorbed fluid phases from within the chamber. The device may also include means for selectively varying the temperature of the fluid phases, such as a heat or ice blanket wrapped around the chamber housing, or probes introduced within the chamber in numerous ways which will be appreciated by those skilled in the art. The apparatus may also include pressure application means for pressuring the fluids within the chamber means.

In another embodiment of the invention, the device provides absorption of one fluid phase with another fluid phase. The fluid phases may each be a gas, liquid, or one phase may be a gas and another phase may be a liquid. In such embodiment, a vessel housing is provided which defines a central chamber. The housing has means through it for introducing one of the phases into the chamber. A shaft extends through the housing and into the chamber, with the shaft having distal and dorsal ends. Motor means are provided for manipulating the shaft and communicating with the shaft at its dorsal end. First and second impeller means having opposing vanes relative to one another are carried around the shaft and in the chamber means. Each of the impeller means has means thereon for receipt and discharge of one of the phases in the chamber as the shaft is manipulated and the impeller is rotated. A vacuum initiating means, such as the squirrel cage defined above, is carried around the shaft at its distal end and in substantial axial alignment with the means for introducing one of the phases into the chamber, and is in fluid communication with the first impeller means. Means are also provided for introducing another of the phases into the chamber through the receipt means of the second impeller means and discharge of the other phase into the chamber as the shaft is manipulated or rotated. Discharge means are provided which are in fluid communication with the chamber means for removal from within the chamber of the resulting absorbed liquid phase from within the chamber. In this embodiment, one fluid phase may be a gas and the other of the phases may be a liquid. Moreover, each of the phases may be a liquid.

DESCRIPTION OF THE PREFERRED EMBODIMENTS

Figure 1:
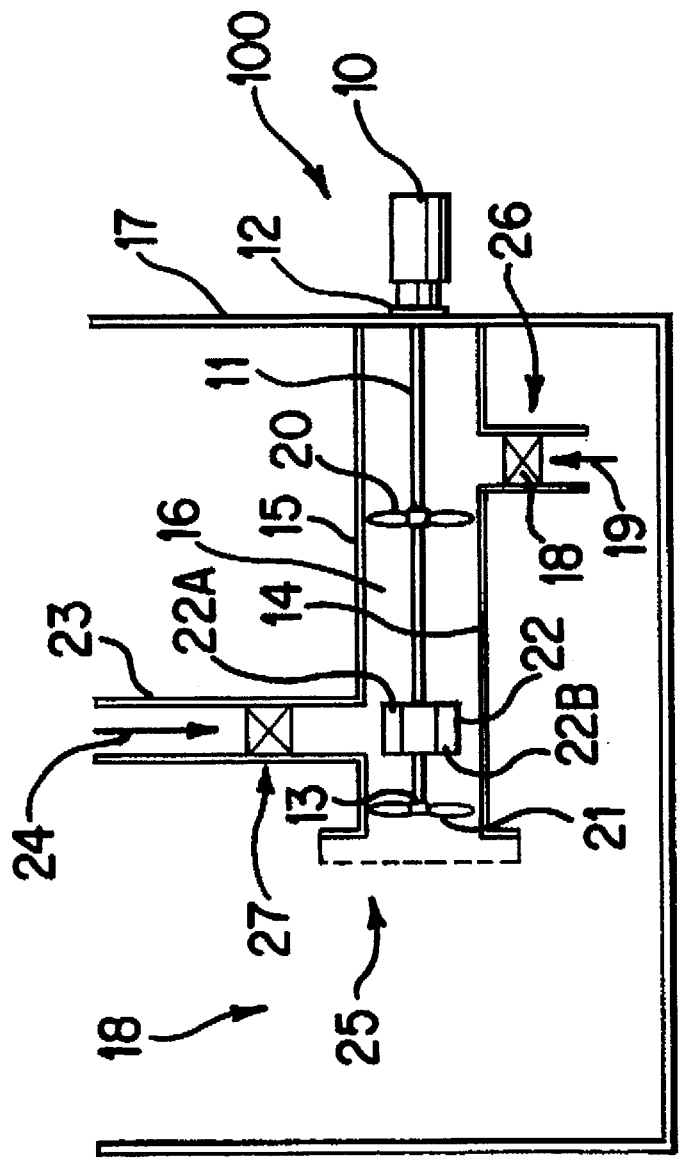
FIG. 1 is a cross section schematic illustration of the various components of the absorption device of the present invention, and shown in one embodiment.

Now referring to FIG. 1, there is shown one embodiment 100 of the present invention. The embodiment 100 includes an electric motor 10 which manipulated a shaft 11. The shaft 11 has a dorsal end 12 in communication with the motor 10. Likewise, the shaft 11 has a distal end 13. Support 14 is provided for alignment of the shaft 11 within a vessel housing 15 defining a central chamber 16 therein. The vessel housing 15 is positioned within a tank, or the like, 17, in which the absorbed fluids are contained.

The vessel housing 15 has means, such as conduit 18, for introducing one of the phases 19 into the chamber 16. Another impeller 21 may be provided in a form the same as or similar to propeller 20 and is positioned relative to the shaft 11 at its distal end 13. Between the impeller 21 and the impeller 20 is positioned on the shaft 11 a vacuum initiating means shown in the form of a squirrel cage vacuum draw. The vacuum initiating means 22 is in substantial axial alignment with means for introducing a gaseous fluid phase, such as conduit 23, communicating with the interior or central chamber 16 of the vessel 15. The conduit 23 provides means for introduction of a gaseous phase 24 through the conduit 23 and into the chamber 16 in axial alignment with vacuum draw 22 which has openings 22a and 22b for introduction and ejection, respectively, of the gaseous phase within the chamber 16 and into the fluid phase 19 passing there across in the chamber 16. The fluid 19 and 24 are absorbed relative to one another by means of the impeller 13. The subsequent absorbed fluid phases are discharged from the vessel 16 into the tank 17, or similar container through the open ends 25 in the vessel 15 and the resultant absorbed fluid 18 is contained within vessel 17 or, alternatively, may be selectively and incrementally removed therefrom, by known means. Valves, such as 26 and 27, may be placed on the conduits 26 and 23, respectively, to open and close, or throttle, the volume/rate of the fluids 19 and 24 introduced there through.

Figure 2:
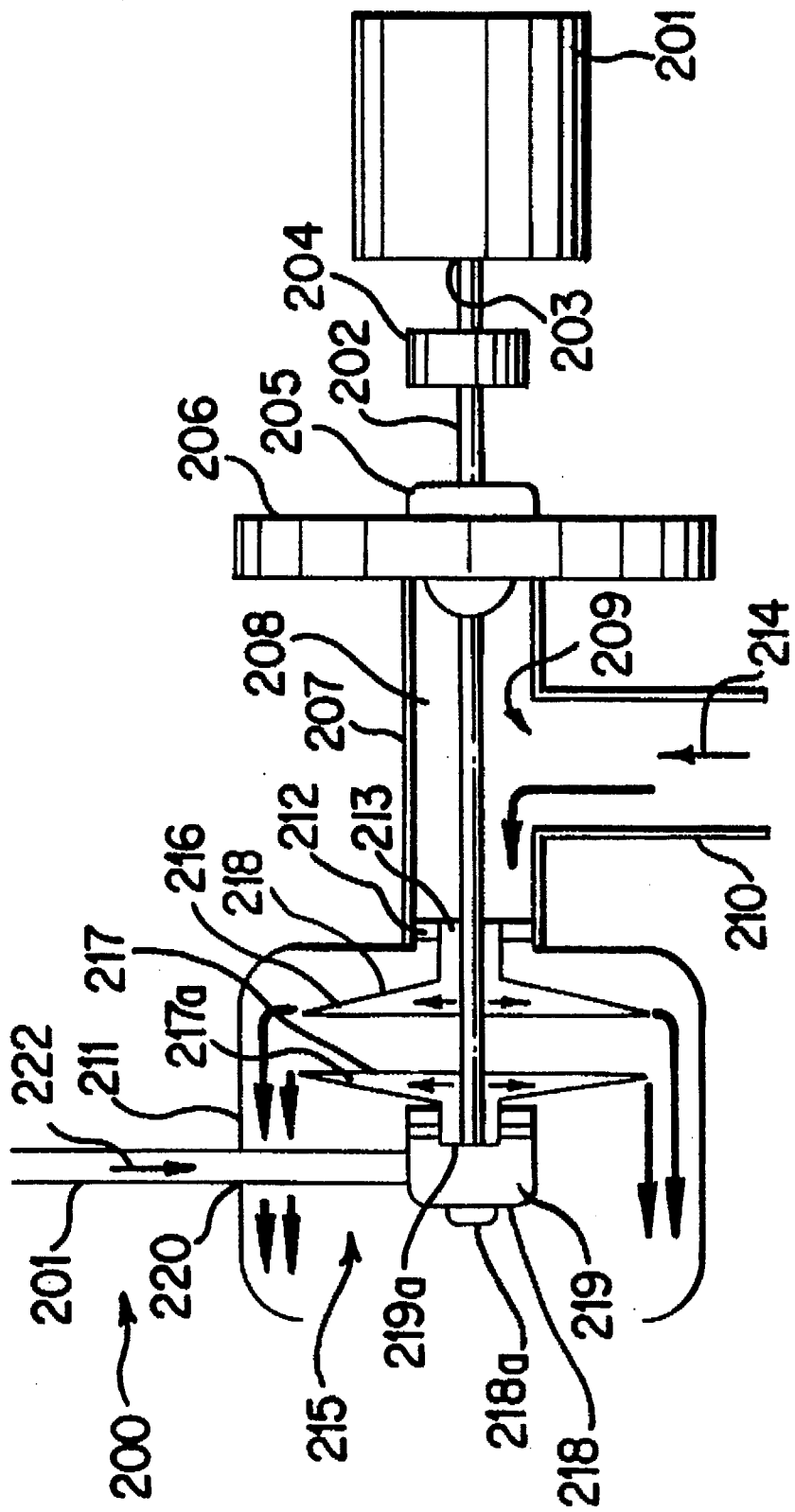
FIG. 2 is a cross section schematic illustration of another embodiment of the present invention.
Figure 4:
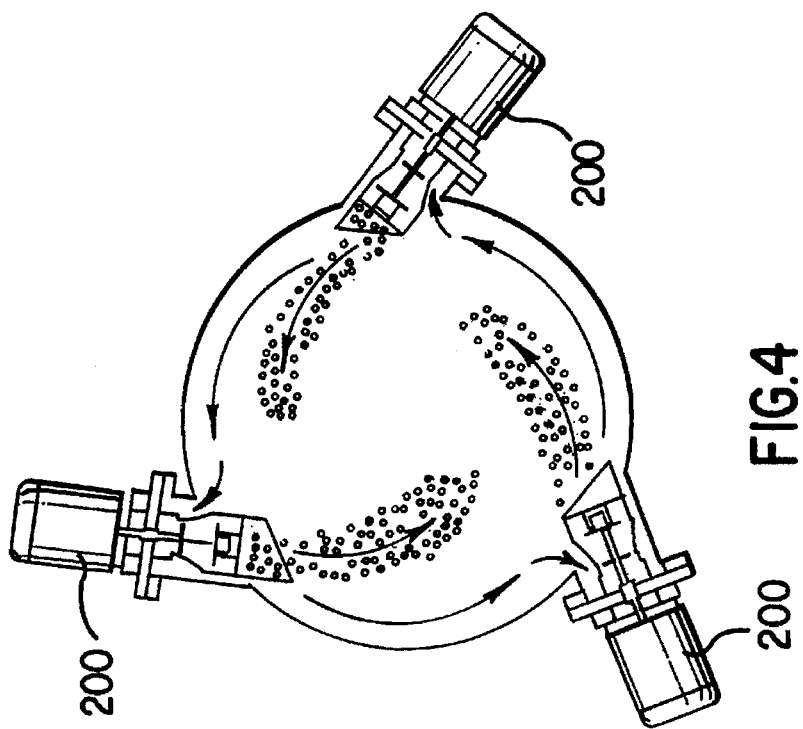
FIG. 4 is a cross section schematic illustration through the chamber of the tank showing a series of absorption devices of the present invention spaced along a horizontal plane.

FIG. 2 shows another version of the preferred embodiment 200. In this embodiment, a motor 201 is provided on a shaft 202 at the dorsal end 203 of the shaft 202 for rotating or otherwise manipulating the shaft 202. Typically, the motor is an electric motor, but may be one driven by fossil fuel burning, such as a diesel engine. A shaft coupling 204 is provided between the motor 102 and the shaft 202. A bearing 205 is disposed around the shaft 202 and communicates with a mechanical seal 206 disposed around and carried on the shaft 202. A hollow conduit is carried on the mechanical seal 206 through which is disposed the shaft 202. The vessel 207 provides a hollow interior chamber 208 around the shaft 202 and also provides an opening 209 through which is received a conduit member 210 for introduction into the chamber 208 of a liquid phase, such as water. The vessel 207 is sealingly secured against and relative to an absorption chamber 211 and sealing there between is provided by impeller seal 212 having an opening there through around the shaft 202 for transmission of the liquid phase 214 from within the chamber 208 into an impeller chamber 215. The impeller chamber 215 houses a series of first and second impellers and 216 and 217, respectively.

As shown, the impellers 216, 217, have vanes thereon (shown schematically) through which the fluid 214 is disposed and agitated into the chamber 215. An impeller support block 218 is provided having support 218a for securement of the impellers and a vacuum initiating means 219 thereon.

An opening 220 is provided within the housing 211 for introduction of a conduit 221 therethrough which will carry a gas or liquid phase 222 therein and into the vacuum initiating means 219 for discharge through opening 219a into the vanes 217a on the impeller 217 and for discharge of said gas or liquid phase 222 into the chamber 215. As the fluid phase 214 and the fluid phase 222 are agitated through the impellers 216, 217, and across the vanes 218, 217a, they are absorbed relative to one another within the chamber 215.

Figure 3:
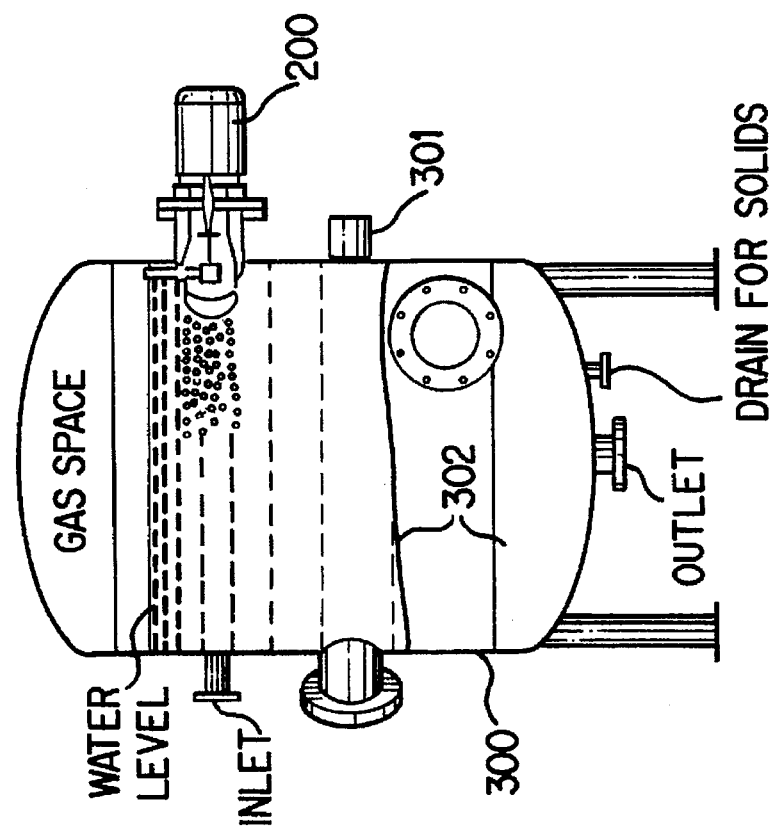
FIG. 3 is an exterior illustration of a chamber extending through a tank housing a series of vertically spaced absorption apparatuses.

The device 200 may be inserted through an opening in a tank 300 shown in FIG. 3 which may be pressurized through pressure means 301, such as a pump, in known fashion, and/or heat or refrigerant may be applied to the interior of the tank 300 such as by use of a thermal blanket 302 wrapped around the exterior, or a part thereof, of the tank 300.

It will be appreciated by those skilled in the art that the impellers 216 and 217 are positioned along the shaft 202 in back-to-back, or reverse, relationship. Likewise, the vanes 218 and 217a create a vacuum inside the respective impellers as they are rotated. This, in turn, permits respective fluid phases 213 and 222 to be drawn across the respective impellers, 218 and 217a for mixing into the resultant absorbed fluid phases.

When the fluid 222 is a gas, such as air, and the fluid 214 is water, it has been found that a very fine dispersal of the gas into the water phase is created as the water is pushed passed the impeller 217. Very find bubbles along the order of a few microns in size are provided by use of the present invention, in either embodiment, and the fine, quality dispersal of these minute bubbles contributes substantially to the ability of the fluid phases to absorb one another.

Each of the apparatuses 100 and 200 provide very finely sheared bubbles when one of the fluids is a gaseous phase and the gas is evenly distributed into the water phase as it passes past the impellers. The water phase comes past the gas phase at the gas impeller and the gas is induced into the water, resulting in a fine mixture of the phases.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. Apparatus for providing adsorption of a gaseous fluid phase with a liquid fluid phase, comprising:
   (1) a vessel defining a central chamber and having a plurality of fluid phase introduction passages therein;
   (2) a shaft traversing said central chamber, said shaft having distal and dorsal ends;
   (3) motor means for manipulating said shaft and communicating with said shaft at its dorsal end;

(4) a plurality of impeller means carried around said shaft and positioned distally away from said shaft dorsal end;

(5) means for introducing said liquid phase into said central chamber between one of said impeller means and said shaft dorsal end;

(6) means for introducing said gaseous fluid phase into said central chamber between said impeller means;

(7) vacuum initiating means carried around said shaft between said impeller means and in substantial axial alignment with said means for introducing said gaseous fluid phase into said central chamber; and (8) a discharge open end through said vessel communicating with said chamber means for transporting the resulting adsorbed fluid phases from within said chamber.

2. The apparatus of claim 1 further comprising means for selectively varying the temperature of said fluid phases within the chamber means.

3. The apparatus of claim 1 further comprising means for pressurizing the fluid within the chamber means.

4. Apparatus for providing adsorption of one fluid phase with another fluid phase, comprising:

(1) a vessel housing defining a central chamber and having means through said housing for introducing one of said phases into said chamber;

(2) a shaft extended through said housing and into said chamber, and having distal and dorsal ends;

(3) motor means for manipulating said shaft and communicating with said shaft at its dorsal end;

(4) first and second impeller means having opposing vanes and carried around said shaft and in said chamber means, each of said impeller means having means thereon for receipt and discharge of one of said phases in said chamber as said shaft is manipulated;

(5) vacuum initiating means carried around said shaft at its distal end and in substantial axial alignment with said means for introducing one of said phases into said chamber and fluid communicating with said first impeller means;

(6) means for introducing another of said phases into said chamber through the receipt means of said second impeller means and discharge of another of said phases into said chamber as said shaft is manipulated; and (7) discharge means in fluid communication with the chamber means for removal from within the chamber of the resulting adsorbed fluid phase from within the chamber.

5. The apparatus of claim 4 wherein one fluid phase is a gas and the other of said phases is a liquid.

6. The apparatus of claim 4 wherein each fluid phase comprises a liquid.

7. The apparatus of claim 4 further comprising means for selectively varying the temperature of the fluid phases within the chamber means.

8. The apparatus of claim 4 further comprising means for pressurizing the fluids within the chamber means.

* * * * *